Patented Aug. 30, 1938

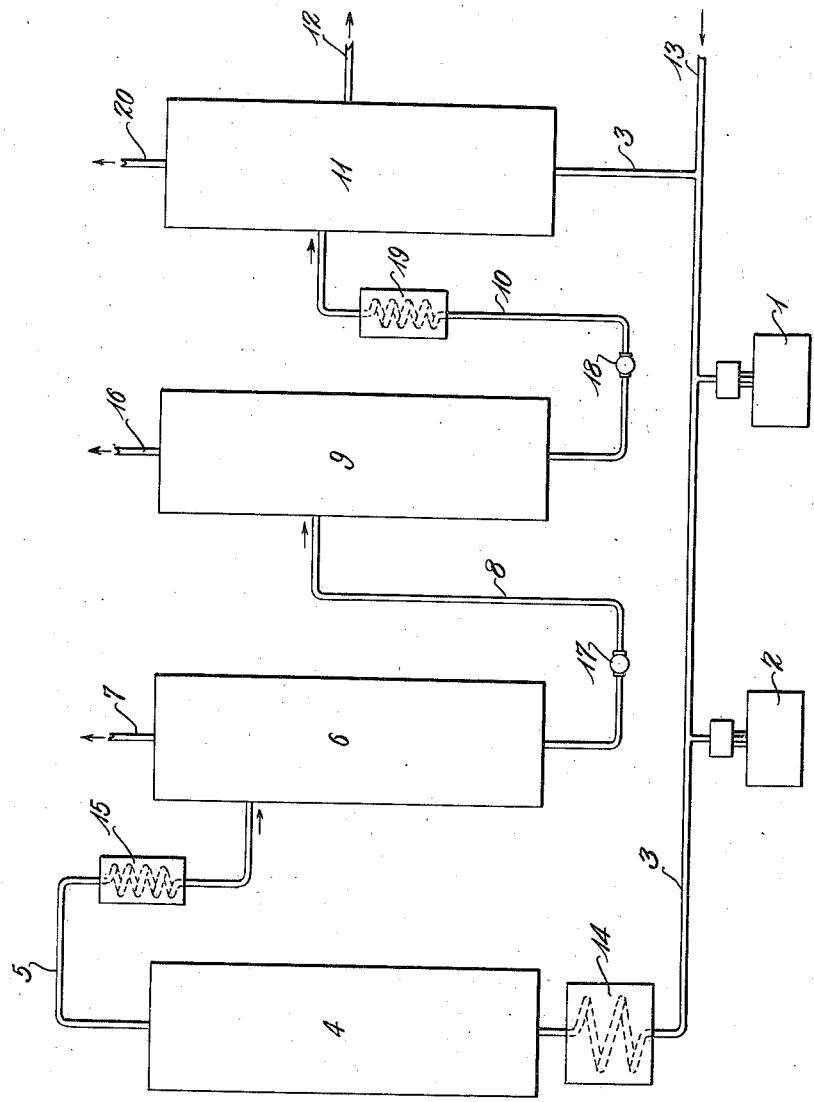

2,128,609

UNITED STATES PATENT OFFICE 2,128,609

PROCESS OF PRODUCING A SOLVENT

Jacquelin E. Harvey, Jr., Hapeville, Ga.

Application June 12, 1937, Serial No. 147,958

16 Claims. (Cl. 134—56)

The invention relates to solvents and has as an object the production of material of great solvent power from wood tar and also the improvement of existing solvents.

It is an object of the invention to produce a high (A. P. I.) gravity, low aniline point solvent from pine tar having especially in view pine tar derived from the destructive distillation of wood.

It is a further object of the invention to increase solvent power of turpentine from whatever source derived.

It is a further object of the invention to produce relatively high (A. P. I.) gravity, low aniline point solvents from aromatic substances of relatively low gravity as a starting material wherein operating ills result from the gravity of the starting material.

A major industry, particularly in the southern part of the United States, is the destructive distillation of wood. This industry utilizes resinous wood for the production of various materials, which wood is distilled to remove substantially all hydrocarbons therefrom and the material recovered is fractionated to recover pyroligneous acid, turpentine, dipentine, pine oil, etc. and results in a substantial residue of pine tar.

The substances recovered other than pine tar meet with a ready sale but the pine tar comprises a product which product is a distress product. This is particularly true since petroleum products have displaced from use the pine tar from some former uses such as use as a rubber softener. Because of this situation the destructive distillation plants are able to operate only a portion, generally three or four months, out of a year. By the present invention the pine tar is converted from 80% to 100% into solvents which meet a ready sale, particularly because of the fact that the solvents produced by the invention are found to have a revolutionary solvent power.

Broadly considered, the invention comprises the treatment of pine tar, when pine tar is used as a starting material, in the following manner.

The tar preferably containing no acid fractions is passed through a vessel, or "oven" adapted to withstand high temperatures and pressures, while under the influence of a catalyst, the material in the oven being maintained at a temperature between substantially 300° F. and 1050° F. and under a pressure of from 50 to 200 atmospheres partial hydrogen pressure.

The precise temperature and pressure and time of treatment depend upon the starting material under treatment and the nature of the final product desired. With the pine tar in the oven hydrogen or hydrogen-containing gas is streamed. The effect of different temperatures, pressures, and supply of hydrogen will be evident from the examples given below.

The material from the oven as it flows is conducted to a gas separator and to some form of fractionating still, the residue from the still being again conducted to the oven, if desired, and under a continuous process fresh tar is supplied to the stream to compensate for the finished product removed from the still.

The above, in brief, is the mode of treatment of the material as comprising a continuous process. It will be understood that a batch process may be adopted, if desired, and yet secure as high as 100% conversion.

An illustrative embodiment of an apparatus for carrying out the process is shown in the accompanying drawing in which the figure is a diagrammatic illustration.

As there shown, 1 represents a pump for causing the circulation of pine tar, while 2 is a compression pump for supplying hydrogen or hydrogen-containing gas under pressure.

The pump forces the material through conduit 3, heater 14, to and through oven 4 wherein the pressure as above stated is between substantially 50 and 200 atmospheres partial hydrogen pressure. The oven 4 is filled or partially filled with catalyst through which the tar and gas pass, escaping therefrom through the conduit 5, through cooler or heat exchange device 15 to a high pressure gas separator 6, where excess hydrogen or other gas is recovered through conduit 7 for any desired use.

The thus treated pine tar flows through conduit 8 through the low pressure gas separator 9 wherein the pressure exists at substantially 3 or 4 atmospheres controlled by a reducing valve as 17. The gas separated in separator 9 is drawn off at 16 and may also be recovered for use. The material from the separator 9 passes through valve 18 in conduit 10 to a heater 19 which may bring the material to a temperature for flash fractionating in fractionating column 11 and wherefrom distillate is recovered as at 12, any excess gas escaping at 20.

It will be understood that other forms of still or fractionating columns may be substituted for the heater 19 and column 11.

The residue from column 11 is returned to conduit 3 for re-treatment and if desired fresh tar may be introduced through conduit 13.

As examples of the solvents produced by different conditions, the following are listed in order that the novel results that have been secured may be understood.

Example 1

Pine tar, gravity 12.8 A. P. I., an initial Hempel distillation point of 243° F. and 90% over at 699° F., and an aniline point of minus 70° F. is fed to an oven at the rate of 1 volume tar per volume catalyst per hour under 200 atmospheres pressure and 750° F. and while streaming hydrogen at the rate of 24,000 cu. ft. per barrel. A Hempel distillation on the beneficiated pine tar to 392° F. showed the following evaluation:

| Percent | Cuts | Temp. F. | A. P. I. | An. pt. F. |
|---|---|---|---|---|
| 5.6 | 1 | 275 | 48.7 | 55 |
| 4.0 | 2 | 320 | 39.2 | 50 |
| 4.0 | 3 | 335 | 37.6 | 45 |
| 4.0 | 4 | 342 | 36.5 | 37 |
| 4.0 | 5 | 352 | 34.9 | 27 |
| 6.3 | 6 | 392 | 31.3 | −4 |
| 72.1 | Bottoms | | 11.8 | −41 |

Example 2

Using the above mentioned pine tar with the above named control with the exception that the heat was raised to 800° F.; a Hempel distillation of the beneficiated pine tar to 392° F. shows the following evaluation:

| Percent | Cuts | Temp. F. | A. P. I. | An. pt. F. |
|---|---|---|---|---|
| 12.50 | 1 | 275 | 54.3 | 79 |
| 3.75 | 2 | 298 | 42.6 | 63 |
| 3.75 | 3 | 314 | 40.5 | 61 |
| 3.75 | 4 | 325 | 38.8 | 59 |
| 3.75 | 5 | 342 | 37.4 | 50 |
| 3.75 | 6 | 347 | 35.6 | 41 |
| 3.75 | 7 | 358 | 34.4 | 32 |
| 6.30 | 8 | 392 | 30.9 | 5 |
| 58.70 | Bottoms | | 15.6 | −27 |

Example 3

Using the above mentioned pine tar with identical control work as named in Example 2, with the exception of heat which was raised to 900° F. Hempel distillation of beneficiated pine tar to 392° F. shows the following evaluation:

| Percent | Cuts | Temp. F. | A. P. I. | An. pt. F. |
|---|---|---|---|---|
| 38.0 | 1 | 275 | 50.4 | 21 |
| 6.0 | 2 | 304 | 36.5 | −7 |
| 6.0 | 3 | 338 | 34.0 | −13 |
| 6.0 | 4 | 364 | 31.0 | −22 |
| 5.0 | 5 | 392 | 26.6 | −38 |
| 39.0 | Bottoms | | 11.9 | −60 |

Example 4

Using the above mentioned pine tar, with identical control work as named in the foregoing example, with the exception of heat which was raised to 950° F.; a Hempel distillation on the beneficiated pine tar showed the following evaluation:

| Percent | Cuts | Temp. F. | A. P. I. | An. pt. F. |
|---|---|---|---|---|
| 10.00 | 1 | 212 | 59.4 | 73 |
| 6.25 | 2 | 236 | 46.0 | 27 |
| 6.25 | 3 | 250 | 41.7 | 5 |
| 6.25 | 4 | 285 | 37.4 | −11 |
| 6.25 | 5 | 308 | 35.7 | −22 |
| 6.25 | 6 | 344 | 32.5 | −30 |
| 6.25 | 7 | 371 | 26.9 | −66 |
| 7.25 | 8 | 392 | 23.1 | −70 |
| 45.25 | Bottoms | | 8.6 | −78 |

Catalysts that have proven effective in the four preceding examples are: Fe and Ni; and promoted Fe and Ni; Ni-Cu, Pt and Pd; Mo, Co, W, and Fe in admixture with $Cr_2O_3$; MoO; CoO and $Cr_2O_3$; ZnO—$Cr_2O_3$ in admixture with other oxides; carbides of Fe, Co and Ni. Sulphides of the various metals and admixtures thereof have at times proven very efficient.

Example 1A

Pine tar as named in the previous examples is passed through the oven at 1 volume tar per volume catalyst per hour at pressure of 200 atmospheres 900° F., while streaming hydrogen at the rate of 3,000 cubic feet per barrel pine oil; a Hempel distillation of the beneficiated pine tar gave the following evaluation:

| Percent | Cuts | Temp. F. | A. P. I. | An. pt. F. |
|---|---|---|---|---|
| 5.50 | 1 | 212 | 69.7 | 116 |
| 6.25 | 2 | 274 | 50.7 | 81 |
| 6.25 | 3 | 301 | 43.8 | 68 |
| 6.25 | 4 | 327 | 40.8 | 63 |
| 6.25 | 5 | 338 | 38.7 | 55 |
| 6.25 | 6 | 346 | 37.3 | 50 |
| 6.25 | 7 | 365 | 35.3 | 34 |
| 6.25 | 8 | 392 | 31.5 | 5 |
| 50.75 | Bottoms | | 17.1 | −15 |

It will be seen by interpolation from the above data that the beneficiated material will have an overall aniline point of 22° F.; that the cut to 392° F. will have an aniline point of 53° F. and that the A. P. I. gravity of said cut will be 43.4.

Example 2A

Pine tar as named in the foregoing example, is subjected to control work as in Example 1A, except temperature was raised to 950° F.; a Hempel distillation of the beneficiated pine tar to 392° F. gave the following evaluation:

| Percent | Cuts | Temp. F. | A. P. I. | An. pt. F. |
|---|---|---|---|---|
| 7.25 | 1 | 212 | 65.3 | 99 |
| 6.25 | 2 | 253 | 47.4 | 52 |
| 6.25 | 3 | 293 | 41.1 | 28 |
| 6.25 | 4 | 326 | 37.0 | 9 |
| 6.25 | 5 | 344 | 34.0 | −9 |
| 9.37 | 6 | 392 | 29.3 | −45 |
| 58.38 | Bottoms | | 9.4 | −65 |

It will be seen that the overall aniline point of this material is −31° F. and the A. P. I. gravity is 25.8.

Example 3A

Pine tar as named in the above example is subjected to control work identical with said example, except temperature was raised to 1000 deg. F. A Hempel distillation to 392° F. on the beneficial tar gave the following results.

| Percent | Cuts | Temp. F. | A. P. I. | An. Pt. F. |
|---|---|---|---|---|
| 9.87 | 1 | 212 | 51.6 | 28 |
| 6.25 | 2 | 294 | 36.8 | −56 |
| 6.25 | 3 | 326 | 32.4 | −62 |
| 6.25 | 4 | 356 | 29.5 | −77 |
| 6.25 | 5 | 392 | 24.1 | −110 |
| 65.13 | Bottoms | | 5.9 | (See note) |

Note—The bottoms (residue) were too dark to run by the conventional aniline point method, but it has been determined that their aromaticity is of a revolutionary value, never before this invention obtained from pine tar in a comparable gravity.

It will be seen that this material has an A. P. I. gravity of not over 20 and that any cut taken at a higher temperature than 392° F. will have an aniline point lower than −110° F.

Various catalysts were used when operating under conditions as set forth in examples numbered 1A, 2A, and 3A; however, the more effective are these capable of exerting some dehydrogenating influence; as examples of said catalysts, I mention Fe, Co, Ni, Cu, Cr; molten metals and alloys; various oxide catalysts: $Fe_2O_3$, $MoO_3$, $WO_3$, $Cr_2O_3$.

*Example 1B*

Using the above mentioned tar and a catalyst from the group last named, and exerting control wherein tar is passed thru oven at 1 volume tar per volume catalyst per hour, temperature 950° F., pressure 200 atmospheres, with hydrogen streaming at rate of 6,000 cubic feet per barrel pine tar; a Hempel distillation of beneficiated pine tar give the noted results:

| Percent | Cuts | Temp. F | A. P. I. | An. pt. F. |
|---|---|---|---|---|
| 7.00 | 1 | 212 | 67.6 | 100 |
| 6.25 | 2 | 262 | 51.1 | 64 |
| 6.25 | 3 | 287 | 43.8 | 43 |
| 6.25 | 4 | 312 | 39.8 | 28 |
| 6.25 | 5 | 344 | 35.6 | 9 |
| 6.25 | 6 | 366 | 32.3 | −13 |
| 6.37 | 7 | 392 | 28.8 | −33 |
| 55.38 | Bottoms | | 11.3 | −83 |

The overall aniline point of this material is −31° F. and the A. P. I. gravity is substantially 26.9.

It has been found that when practicing the invention as set forth by the control work noted in the foregoing examples, the oven overhead (modified pine tar without distillation) varies in gravity from substantially 29.0 A. P. I. to substantially 14.0 A. P. I. The oven overhead has been found to be an excellent solvent and it falls within the purview of this invention to use it as such and constitutes a valuable part of the invention.

However, it is to be fully understood that recovery of solvent to 292° F. is merely an arbitrary point; the distillation point may be raised or lowered as desired to change the character of the solvent. For instance, a fraction boiling from 419° F. to substantially 550° F. was cut from the beneficiated pine tar processed under control work as set forth in Example 3A.

At the present time, there is on the market a commercial solvent, boiling within the above named range, which ranks among the leaders in solvent power. The overall aniline point of said solvent is minus 30° F. When the fraction boiling between the above named limits is cut from the beneficiated pine tar as processed in accordance with the control work of the invention as set forth in Example 3A, the overall aniline point is evaluated at minus 69° F. Thus a very revolutionary solvent has been produced. Such solvents have never before, so far as applicant is aware, been produced from pine tar.

It will again be understood that the foregoing examples serve merely as illustrations of the many solvents which can be produced by the process. However, I further cite as an example of a solvent produced in accordance with the control as in Example 3A, a solvent boiling between 410° F. and 680° F. shows an aniline point of minus 85° F.

The foregoing examples serve to show details of the invention wherein from 80 to 100% of pine tar can be converted into a high (A. P. I.) gravity, low aniline point solvent. By this invention, the distress product, pine tar, of the destructive distillation wood industry is converted into a valuable solvent as witness evaluation of the aniline points. The solvents thus produced, because of their high solvent power move readily in trade channels, such as the rubber, paint, varnish, lacquer and synthetic resin industries.

Another especial object of the invention is the increasing of solvent power in the solvents having low or medium solvent power. Practitioners in the art will readily understand how this invention can be applied to all solvents; as an example of the various solvents which may be improved by the process of this invention, I mention turpentine of all classes, dipentene, pine oil, navy pitch, pinap, laksol, pine creosote, or any fraction or combination of fractions of the materials mentioned.

It has been found that when various of the above named solvents and others, are treated by the process of the invention, their adaptability to the synthetic resin industry has been increased; too, when using the solvents variously produced as a result of the invention, especially those fractions displaying unusually high solvent power in varnish, lacquer, and enamels where high gloss is desired, an extra and unexpected high gloss is effected, the reason for which is not known.

A feature of the invention resides in the method of treating the Hempel bottoms (residue) as for instance the Hempel bottoms as shown in Example 3A. It will be noted that the conditions named in this example are 1000° F., 3,000 cubic feet hydrogen per barrel tar and one volume tar per volume catalyst per hour. The aniline points developed were totally unexpected when viewed in any light, especially in the light of the boiling range. However, the Hempel bottoms had a gravity A. P. I. of 5.9 and when the same were recycled to the oven under identical control, great ills were experienced, as for instance, low recovery from the oven and deposits of carbon on the catalyst which shortens the life of the same. I have found that by mixing said bottoms with a suitable solvent as for instance a solvent of petroleum, coal tar or pine tar origin, and then subjecting said mixture to control as noted in Example 3A, the bottoms can be converted to the desired product with partial or total elimination of the above mentioned ills.

Solvents produced in accordance with the invention may be stabilized as to color, if desired, by any known and standard method which forms no part of the present invention.

Further referring to the time element of the process of the invention: As set forth in the examples given, the tar is treated one volume of tar per volume of catalyst per hour. The catalyst used is a mass substantially filling the oven. The rate of movement, in the examples given is such that the tar is completely changed in about one hour. Thus the time of treatment is the period named.

In the case of batch operation, when the hydrogen is static above an agitated mass of tar the time of treatment will be substantially three to four hours to secure the results set forth in the examples given.

The solvents thus produced are of great value as blending agents with solvents of lower solvent power to accomplish results that will immediately become apparent to those skilled in the art. Also, when solvents are produced that have unusually low aniline points, such solvents may be blended with conventional motor spirits to secure a beneficiated octane number.

I claim:

1. The process of producing a solvent which comprises: subjecting pine tar in the presence of a catalyst at a temperature of between substantially 700° and 1100° F. to the action of between 3,000 and 24,000 cubic feet of hydrogen per barrel of tar at a pressure of between substantially 50 and substantially 200 atmospheres partial hydrogen pressure with the conditions of time, temperature, pressure and gas supply so adjusted to each other that the treated material will distill at least 5.6% at 275° F. and not less than 27.9 at 392° F. and will contain a substantial percentage of fractions having an aniline point not higher than −15° F. and have an overall aniline point of not over 22° F.

2. The process of claim 1 including the step of distilling the beneficiated material to at least 392° F. to recover the desired solvent as a distillate.

3. The process of producing a solvent which comprises: subjecting pine tar in the presence of a catalyst at a temperature of between substantially 700° and 1100° F. to the action of between 3,000 and 24,000 cubic feet of hydrogen per barrel of tar at a pressure of between substantially 50 and substantially 200 atmospheres partial hydrogen pressure with the conditions of time, temperature, pressure and gas supply so adjusted to each other that the treated material will distill at least 5.6% at 275° F. and not less than 27.9% at 392° F. and will contain a substantial percentage of fractions having an aniline point not higher than −15° F. and have an overall aniline point of not over 22° F., distilling the beneficiated material to an upper limit determined by the desired nature of solvent, to secure the desired solvent as a distillate and restoring the volume of residue by addition thereto of fresh starting material and repeating the cycle.

4. The process of producing a solvent which comprises: subjecting pine tar in the presence of a catalyst at a temperature of between substantially 700° and 1100° F. to the action of between 3,000 and 24,000 cubic feet of hydrogen per barrel of tar at a pressure of between substantially 50 and substantially 200 atmospheres partial hydrogen pressure the conditions of time, temperature, pressure, and gas supply being so adjusted to each other that when a distillation cut is taken from the material at 392° F. the distillate will have an overall A. P. I. gravity not higher than 43.4 and an aniline point of not higher than 53° F. and will contain a substantial percentage of fractions having an aniline point not above 5° F.

5. The process of producing a solvent which comprises: subjecting pine tar in the presence of a catalyst at a temperature of between substantially 700° and 1100° F. to the action of between 3,000 and 24,000 cubic feet of hydrogen per barrel of tar at a pressure of between substantially 50 and substantially 200 atmospheres partial hydrogen pressure with the conditions of time, temperature, pressure, and gas supply so adjusted to each other that the treated material will have an overall A. P. I. gravity not above 20 and a substantial percentage of fractions having an aniline point not above −110° F. and removing a distillation cut from the thus treated material between the temperatures of 419° F. and 550° F. having an aniline point not above −110° F.

6. The process of producing a solvent which comprises: continuously moving pine tar having an upper boiling point in excess of 699° F. and an A. P. I. gravity of not more than 12.8 through an oven in contact with a catalyst at a rate of substantially one volume of tar per volume of catalyst per hour; streaming hydrogen through the oven at a rate of between 3,000 and 24,000 cubic feet per barrel of tar at a pressure of between substantially 50 and substantially 200 atmospheres partial hydrogen pressure while maintaining the material in the oven at a temperature between substantially 700° and 1100° F. so adjusting the conditions of gas supply, temperature and pressure that the treated material will distill not less than 27.9% at 392° F. and that said distillate will have an aniline point of not above 22° F. and an A. P. I. gravity not above 43.4; and continuously moving the treated material through a fractionating apparatus maintained at a temperature of not less than 392° F. to secure the desired solvent as a distillate.

7. The process of claim 6 and repeating the cycle under the named conditions.

8. The process of producing a solvent which comprises: subjecting pine tar in the presence of a catalyst at a temperature of between substantially 700° and 1100° F. to the action of between 3,000 and 24,000 cubic feet of hydrogen per barrel of tar at a pressure of between substantially 50 and substantially 200 atmospheres partial hydrogen pressure with the conditions of time, temperature, pressure and gas supply so adjusted to each other that the treated material will distill between 5.6% and 38% at 275° F. and from 27.9% to 60% at 392° F. and will contain a substantial percentage of fractions having an aniline point not higher than −15° F. and an overall aniline point of not over 22° F.

9. The process of claim 8 including the step of distilling the beneficiated material to at least 392° to recover the desired solvent as a distillate.

10. The process of producing a solvent which comprises: subjecting pine tar in the presence of a catalyst at a temperature of between substantially 700° and 1100° F. to the action of between 3,000 and 24,000 cubic feet of hydrogen per barrel of tar at a pressure of between substantially 50 and substantially 200 atmospheres partial hydrogen pressure with the conditions of time, temperature, and pressure and gas supply so adjusted to each other that the treated material will distill between 5.6% and 38% at 275° F. and from 27.9% to 60% at 392° F. and will contain a substantial percentage of fractions having an aniline point not higher than −15° F., and have an overall aniline point of not over 22° F., distilling the beneficiated material to an upper limit determined by the desired nature of solvent, to secure the desired solvent as a distillate and restoring the volume of residue by addition thereto of fresh starting material and repeating the cycle.

11. The process of producing a solvent which comprises: subjecting pine tar in the presence of a catalyst at a temperature of between substantially 700° and 1100° F. to the action of between 3,000 and 24,000 cubic feet of hydrogen per barrel of tar at a pressure of between substantially 50 and substantially 200 atmospheres partial hydrogen pressure the conditions of time, temperature, pressure, and gas supply being so adjusted to each other that when a distillation cut is taken from the material at 392° F. the distillate will have an overall A. P. I. gravity not higher than 20.4 and will contain a substantial percentage of fractions having an aniline point not above −110° F.

12. The process of producing a solvent which comprises: continuously moving pine tar having an upper boiling point in excess of 600° F. and an A. P. I. gravity of less than 15 through an oven in contact with a catalyst at a rate of substantially one volume of tar per volume of catalyst per hour; streaming hydrogen through the oven at a rate of between 3,000 and 24,000 cubic feet per barrel of tar at a pressure between substantially 50 and substantially 200 atmospheres partial hydrogen pressure while maintaining the material in the oven at a temperature between substantially 700° and 1100° F.; so adjusting the conditions of gas supply, temperature and pressure that the treated material will distill between 27.9% and 60% at 392° F. and that said distillate will have an aniline point of not above 22° F. and an A. P. I. gravity not above 43.4 and continuously moving the treated material through a fractionating apparatus maintained at a temperature of not less than 392° F. to secure the desired solvent as a distillate.

13. The process of claim 12 and repeating the cycle under the named conditions.

14. The process of converting upward of 80% of pine tar into a solvent having a relatively low aniline point which comprises: subjecting pine tar in the presence of a catalyst, to from 3,000 to 24,000 cubic feet of hydrogen per barrel of tar, at a temperature between substantially 700° and 1100° F., and a partial hydrogen pressure between substantially 50 and 200 atmospheres, the conditions of time, temperature, pressure and gas supply so chosen as to produce a material distilling not more than 10% at 212° F. of a distillate having an aniline point not above 116° F., distilling the thus treated material to an upper limit not over 550° F. to secure a distillate having an overall aniline point not above —55° F. and repeating the cycle on the residue.

15. The process of producing a solvent which comprises: subjecting pine tar in the presence of a catalyst at a temperature of between substantially 700° and 1100° F. to the action of between 3,000 and 24,000 cubic feet of hydrogen per barrel of tar at a pressure of between substantially 50 and substantially 200 atmospheres partial hydrogen pressure with the conditions of time, temperature, pressure and gas supply so adjusted to each other to produce a material distilling at least 22.37% at 326° F., and having a substantial percentage with an aniline point not above —77° F., removing a fraction of the thus treated material distilling between substantially 326° F. and substantially 356° F. as the desired solvent having an aniline point not substantially above —77° F.

16. The process of producing solvents of desired qualities which comprises: treating pine tar in the presence of a catalyst at a temperature of between substantially 700° and 1100° F. to the action of between 3,000 and 24,000 cubic feet of hydrogen per barrel of tar at a pressure of between substantially 50 and substantially 200 atmospheres partial hydrogen pressure with the conditions of time, temperature, pressure and gas supply so adjusted to each other as to produce a material having an overall aniline point not higher than 22° F., and an A. P. I. gravity of not over 30.2 fractionating the beneficiated material to secure at least one cut falling within the boiling range of the desired solvent and having an aniline point of not over 116° F., and recycling a substantial amount of the residue.

JACQUELIN E. HARVEY, JR.